United States Patent [19]

Boigelot et al.

[11] Patent Number: 5,768,498
[45] Date of Patent: Jun. 16, 1998

[54] PROTOCOL VERIFICATION USING SYMBOLIC REPRESENTATIONS OF QUEUES

[75] Inventors: Bernard Armand G.G. Boigelot, Liege, Belgium; Patrice I. Godefroid, Naperville, Ill.

[73] Assignee: Lucent Technologies, Murray Hill, N.J.

[21] Appl. No.: 590,239

[22] Filed: Jan. 23, 1996

[51] Int. Cl.$^6$ ............................................. G06F 11/00
[52] U.S. Cl. .......................... 395/183.15; 395/183.09
[58] Field of Search .......................... 395/183.15, 500, 395/183.01, 183.09; 371/27, 22.1, 22.2, 22.3, 22.4, 22.5, 22.6, 25.1

[56] References Cited

U.S. PATENT DOCUMENTS

| | | | |
|---|---|---|---|
| 4,764,863 | 8/1988 | Silverthorn | 364/200 |
| 5,299,206 | 3/1994 | Beaverson | 371/22.1 |
| 5,513,122 | 4/1996 | Cheng et al. | 364/489 |
| 5,574,919 | 11/1996 | Netravali et al. | 395/561 |
| 5,615,137 | 3/1997 | Holtmann | 364/578 |
| 5,659,555 | 8/1997 | Lee et al. | 395/183.09 |

*Primary Examiner*—Albert DeCady
*Attorney, Agent, or Firm*—Donald P. Dinella

[57] ABSTRACT

A finite symbolic representation of the states of an unbounded FIFO queue. Because the representation is protocol verification tools of the type which explore the state space of a protocol may be used to verify protocols which involve unbounded FIFO queues and consequently have an infinite state space. In a preferred embodiment, the finite symbolic representation is used together with a finite state automaton whose states are the global states of the protocol. A symbolic representation of the queue states is associated with each of the global states. State space exploration continues until all new queue states reached are already contained in the states of the finite symbolic representation. Increased processing speed is achieved by employing meta-transitions in the finite state automaton and exploring the meta-transitions from a global state before exploring the ordinary transitions.

11 Claims, 6 Drawing Sheets

ALTERNATING-BIT PROTOCOL

SEND (queue_id $i$, message $m$, QDD(M,S,$\Delta$,$s_0$,F)){
For all states $s \in S$ such that
$$\exists w \in (\cup_{j=1}^{i} M_j)^* : s_0 \xrightarrow{w} s$$
$\wedge (:s \in F \text{ or } \exists t=(s,m',s') \quad :m' \in M_j, j>i),$
do the following operations:
- add a new state $s'$ to S;
- for all transitions $t=(s,m',S'') \in \Delta$ such that $m' \in M_j, j>i$:
    if $s=s''$, replace $t$ by $(s',m',S'')$
    else replace $t$ by $(s',m',s'')$;
- add $(s,m,s')$ to $\Delta$;
- if $s \in F$, remove $s$ from F and add $s'$ to F
Return NORMALIZE(M,S,$\Delta$,$s_0$,F)).
} ⎫ 801

RECEIVE (queue_id, message $m$, QDD(M,S,$\Delta$,$s_0$,F)){
For all states $s_0 \in S$ such that $\in$
$$\exists w \in (\cup_{j=1}^{i-1} M_j)^* : s_0 \xrightarrow{w} s,$$
do the following operations:
- if $s \in F$ and $\beta(s,m,s) \in \Delta$, then remove $s$ from F;
- for all transitions $t=(s,m',s') \in \Delta$ such that $s \neq s'$ and $m' \in M_j, i \leq j$:
    if $m'=m$, replace $t$ by $(s,e,s')$
    else if $(s,m,s) \in \Delta$ then remove $t$ from $\Delta$
Return NORMALIZE(M,S,$\Delta$,$s_0$,F)).
} ⎫ 803

FIG. 9

SEND-STAR (queue_id, $i$, message $m$, QDD $(M, S, \Delta, s_0, F))\{$
For all states $s \in S$ such that
$$\exists w \in (\cup_{j=1}^{i} M_j)^* : s_0 \xrightarrow{w} s$$
$\wedge (: s \in F \text{ or } \exists t = (s, m', s') \in \Delta : m' \in M_j, j > i),$
do the following operations:
- add two new states $s'$ and $ss''$ to $S$;
- for all transitions $t = (s, m', s''') \in \Delta$ such that $m' \in M_j, j > i$:
    if $s \neq s'''$, replace $t$ by $(s', m, s'')$
    else replace $t$ by $(s', m', s'')$;
- add $(s, e, s')$, $(s', m, s')$, and $(s', e, s'')$ to $\Delta$
- if $s \in F$, remove $s$ from $F$ and add $s''$ to $F$
Return NORMALIZE$(M, S, \Delta, s_0, F))$.
}                                                                    ⎬ 901

Receive-Star(queue_id $i$, message $m$, QDD $(M, S, \Delta, s_0, F))\{$
For all states $s \in S$ such that
$$\exists w \in (\cup_{j=1}^{i-1} M_j \cup \{m\})^* : s_0 \xrightarrow{w} s,$$
do the following operations:

- for all transitions $t = (s, m, s') \in \Delta$ such that $s \neq s'$, add $(s, e, s')$ to $\Delta$
Return NORMALIZE$(M, S, \Delta, s_0, F))$.
}                                                                    ⎬ 903

Receive-Send-Star(queue_id $i$, message $m_1$, queue_id $j$, message $m_2$, QDD$(M, S, \Delta, s_0, F))[$
let $n$ be the length of the longest sequence $s_1 \xrightarrow{m_1} s_2 \xrightarrow{m_1} s_3 \ldots \xrightarrow{m_1} s_{n+1}$ of
transitions labeled by $m$ in the QDD such that
$$\exists w \in (\cup_{k=1}^{i-1} M_k)^* : s_0 \xrightarrow{w} s,$$
$\wedge \forall s_k, 1 \leq k \geq n : s_k \neq s_k + 1$ Let $A_0$ denote the QDD $(M, S, \Delta, s_0, F)$
For all $k$, $1 \leq k \geq n$, compute $A_k = $SEND$(i, m_2$RECEIVE$(i, m_1, A_k-1))$
Compute $A_{n+1} =$ SEND-STAR$(j, m_2,$ RECEIVE$(i, m_1, A_n))$
Return NORMALIZE $(\cup_{k=0}^{n+1} A_k)$
}                                                                    ⎬ 905

PROTOCOL VERIFICATION USING SYMBOLIC REPRESENTATIONS OF QUEUES

BACKGROUND OF THE INVENTION

1. Field of the Invention

The invention relates generally to the verification of protocols and more specifically to verification of protocols where communication is by unbounded queues.

2. Description of the Prior Art

A protocol is a set of rules that governs the interaction of concurrently-operating entities. A simple example of a protocol is the set of rules used to govern the flow of traffic through a single-lane stretch of road. The rules involve two flagmen, one at each end of the single-lane stretch. Each flagman may block traffic from entering his end or permit traffic to enter. The rules for the protocol are the following:

At the beginning, the first flagmen is blocking traffic from entering and the second is allowing it to enter.

When the first flagman who is blocking traffic has vehicles waiting, he signals the second flagman to begin blocking traffic.

The second flagman begins blocking traffic.

The first flagman waits until all vehicles are out of the single-lane stretch and then allows the waiting vehicles to enter.

When the second flagman has vehicles waiting, he signals the first flagman to begin blocking traffic, and so forth.

Even this protocol is more complex than it seems. For example, how does the flagman who has vehicles waiting know when all of the vehicles are out of the single-lane stretch? or how is it decided which flagman blocks and which allows traffic at the beginning? or what happens if both flagmen always have vehicles waiting? If such questions are not answered, situations may arise in which both flagmen block traffic, so that no traffic can enter the single-lane stretch, or both flagmen permit traffic to enter and a collision results, or there are no accidents, but too little traffic can pass through the stretch.

Protocols specify not only how flagmen control traffic in a one-lane stretch of highway, but also how computers communicate with each other and with devices such as printers or airplane control surfaces and how the switches and other devices in a telecommunications network communicate with each other. It is important and often vital that the rules of a protocol are complete and do not result in undesirable behavior by the system in which the protocol is used. In all but the simplest cases, it is also impossible for humans to anticipate all of the situations which may arise when components of a system communicate by a protocol. Because this is the case, the human designers of a protocol can be sure neither that their design for the protocol is correct nor that their tests of the design will detect all of the situations in which the protocol results in undesirable behavior.

Protocol designers have dealt with the above problem by developing tools which verify that a protocol is correct. A protocol whose correctness has been verified is one for which it has been proven (in the mathematical sense of that word) that the use of the protocol in a system will not result in undesirable behavior by the system. Many of these tools work by exploring a global state graph for the system in which the protocol is employed. The global state graph represents the combined behavior of all components of the system which operate concurrently when the system is operating according to the protocol. The global state graph has nodes connected by edges that may be traversed in only one direction. Each node represents a state of the system; each edge represents a transition from the state represented by the node which is the source of the edge to the state represented by the node which is the destination of the edge.

The global state graph is explored by starting from a given initial state and then recursively exploring all successor states of all states encountered during the exploration by following the edges for all transitions from each state. The state graph that is explored is called the state space of the system. Many different types of properties of a system can be checked by exploring its state space: deadlocks, dead code, violations of user-specified assertions, etc. Moreover, the range of properties that state-space exploration techniques can verify has been substantially broadened during the last decade thanks to the development of model-checking methods for various temporal logics. See for example, E. M. Clarke, et al., "Automatic verification of finite-state concurrent systems using temporal logic specifications", *ACM Transactions on Programming Languages and systems*, 8(2): 244–263, January, 1986; O. Lichtenstein and A. Pnueli, "Checking that finite state concurrent programs satisfy their linear specification", in: *Proceedings of the Twelfth ACM Symposium on Principles of Programming Languages*, pp. 97–107, New Orleans, Jan., 1985, J. P. Quielle and J. Sifakis, "Specification and verification of concurrent systems in CESAR", in: *Prc. 5th Int's Symp. on Programming*, vol 137 of *Lecture Notes in Computer Science*, pp. 337–351, Springer-Verlag, 1981, or M. Y. Vardi and P. Wolper. "An Automata-Theoretic Approach to Automatic Program Verification", in: *Proceedings of the First Symposium on Logic in Computre Science*, pp. 322–331, Cambridge, June 1986.

Verification by state-space exploration has been studied by many researchers. See M. T. Liu, "Protocol engineering", *Advances in Computing* 29:79–195, 1989 or H. Rudin, "Network protocols and tools to help produce them", *Annual Review of Computer Science* 2:291–316, 1987. The simplicity of the strategy lends itself to easy, and thus efficient, implementations by means of programs executing on standard computer systems. Moreover, verification by state-space exploration is fully automatic: no intervention of the designer is required. The main limit of state-space exploration verification techniques is the often excessive size of the state space. Obviously, this state-explosion problem is even more critical when the state space being explored is infinite.

Unfortunately, protocols for many systems have an infinite state space. One important class of such protocols is those in which the at least some of the components of the system which are cooperating according to the protocol communicate by means of unbounded FIFO queues (a FIFO queue is a first in-first out queue, i.e., one in which items are removed from the queue in the order in which they are placed in the queue). In such protocols, the global state of the system includes the content of the queues. Since the queues are unbounded, there is no limit to the different contents that the queues may have, and thus no limit to the state space. Because the state space is infinite, protocols with unbounded FIFO queues cannot be verified by verification tools which explore the state space for the protocol. It is an object of the techniques disclosed herein to make protocols involving unbounded FIFO queues verifiable.

SUMMARY OF THE INVENTION

The object is attained by providing a state graph for a protocol with unbounded FIFO queues which includes finite symbolic representations of the states of the unbounded FIFO queues. Because the symbolic representations are finite, the state graph may be verified by verification tools that work by exploring the state space for the protocol.

Other aspects of the invention include verification apparatus and methods which employ the symbolic representations. In these apparatus and methods, the state exploration which is done as part of the verification process continues until the queue states reached by the exploration are already contained in the symbolic representations. In a preferred embodiment, the protocol is represented by finite state automata in in which certain loops of the automata are replaced by meta-transitions. Each of the control states of the protocol's state space has a symbolic representation of the queue states associated with it. During exploration of the states of the finite state automaton, the queue states associated with the meta-transitions from a given control state are explored before the queue states associated with ordinary transitions.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 9 is algorithms for the $(q_i!m)^*$, $(qi?m)^*$, and $(q_i?m_1; q_j!m_2)^*$ operations;

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first present an overview of a protocol verification system of the type with which the invention is concerned, and will then present an example protocol with unbounded FIFO queues, a detailed mathematical exposition of the invention, and a discussion of a preferred embodiment of the invention.

Figure 1:
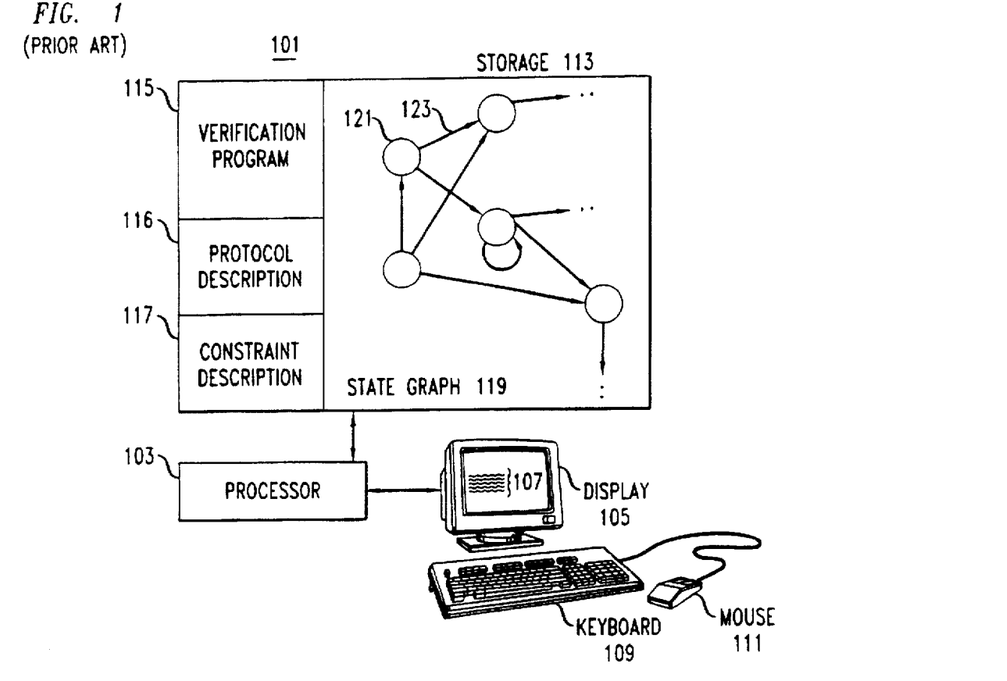
FIG. 1 is a block diagram of a protocol verifier.

Overview of a Protocol Verification System: FIG. 1

FIG. 1 is an overview of a prior-art protocol verification system 101 employing a control state graph. Such systems are described in detail in Gerard Holzmann, *Design and Validation of Computer Protocols*, Prentice-Hall, Englewood Cliffs, N.J. 1991. System 101 is implemented in a standard programmable computer system including a processor 103, data storage 113, which will include memory and may include other storage devices such as disk drives, and input-output devices including a display 105, a keyboard 109, and a mouse 111. When system 101 is operating, memory 113 contains a verification program 115, a description of the protocol being verified 116, a description 117 of the constraints which the protocol must satisfy, and a state graph 119 for the protocol. The state graph is represented by data items for state nodes 121 and transition edges 123. Operation of system 101 is as described above. Beginning with an initial state for the protocol described in protocol description 116, verification program 115 analyzes state graph 119 to determine whether the constraints specified in constraint description 117 are satisfied. Result 107 of the analysis is output to display 105 or to some other output device. Protocol description 116 and constraint description 117 may be input using keyboard 109 or may be read from a file available to processor 103.

Verification system 101 has a fundamental limitation: it can only verify a protocol if the protocol's state space is small enough that state graph 119 fits into storage 113. Moreover, the larger the number of states is, the longer it takes processor 103 to analyze state graph 119. If the number of states in the state space is infinite, no verification system 101 will have sufficient storage 113 for state graph 119 and none will be able to finish the analysis.

Figure 2:
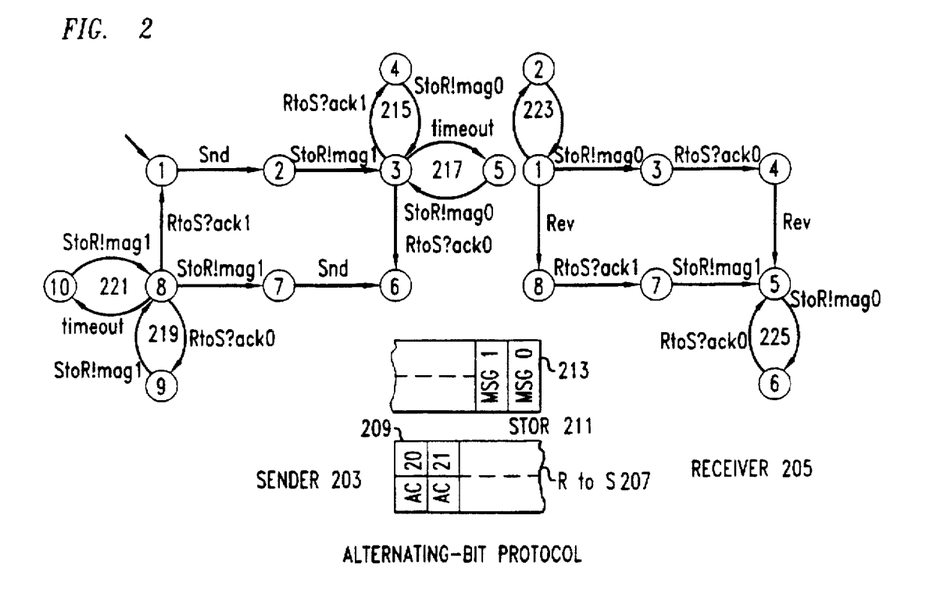
FIG. 2 is a pair of finite state machines which define an alternating bit protocol.
Figure 3:
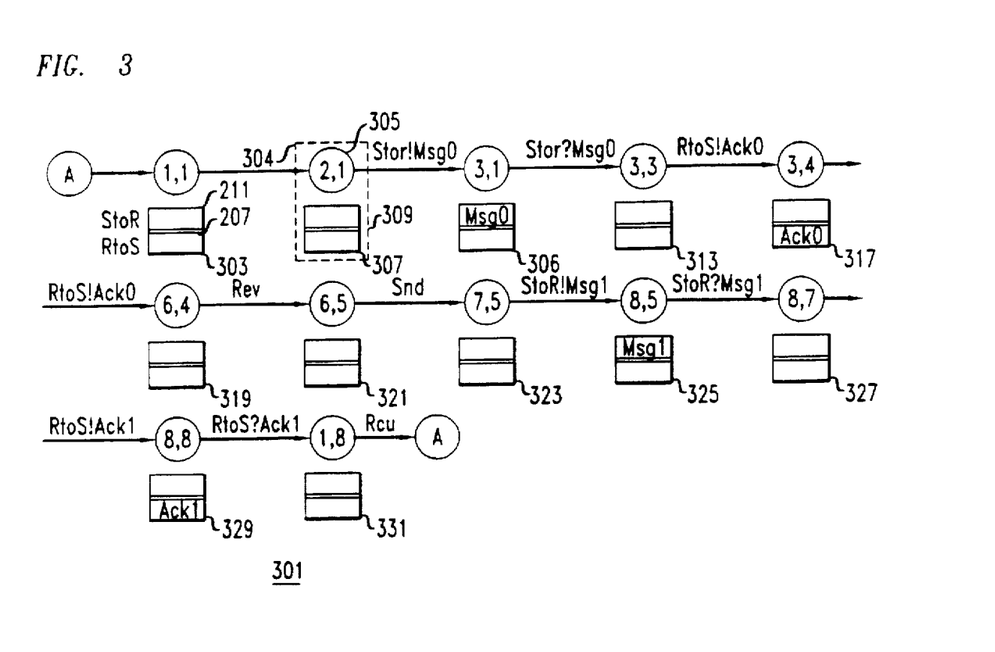
FIG. 3 is a first portion of the control state graph for the alternating bit protocol.
Figure 4:
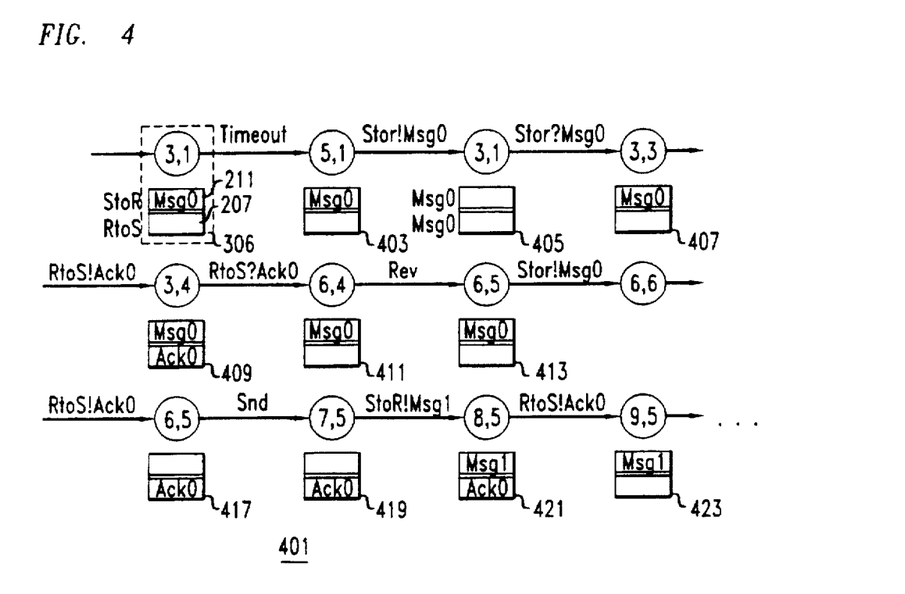
FIG. 4 is a second portion of the control state graph for the alternating bit protocol.

Example of a Protocol with an Infinite State Space: FIGS. 2-4

Even very simple protocols may have an infinite state space. FIG. 2 shows one such protocol, the well-known alternating-bit protocol, which will be used as an example throughout the following discussion. In the alternating bit protocol, a sender 203 sends messages 213 to a receiver 205, which returns acknowledgements 209 to sender 203. In order to ensure that receiver 205 receives the messages in the order in which they are sent, sender 203 alternately appends a 1 bit or an 0 bit to each message. When receiver receives a message, it sends an acknowledgement to which a bit is appended which has the value of the appended bit on the received message. Sender 203 waits to send the next message until it has received an acknowledgement with an appended bit whose value is the same as the appended bit of the last message sent. If the appended bit's value is not the same, sender 203 resends the last message. The appended bit on the next new message has a value which is opposite to that of the last message sent. Sender 203 writes the messages it sends to first in-first out (FIFO) queue StoR 211, and receiver 205 reads the messages from StoR 211. When receiver 205 receives a message, it writes the acknowledgement to FIFO queue RtoS 207, and sender 203 reads the acknowledgement from the queue. There is no limit to the size of queues 207 and 211.

In FIG. 1, sender 203 and receiver 205 are finite state machines, that is, the operation of sender 203 and receiver 205 can be described as a state graph in which transitions take place between a finite number of states. In FIG. 2, each state is represented by a circle with a number, and each transition is represented by an arrow. The label on the arrow is an abbreviation for the operation that causes the transition to the next state. There are 8 queue operations and three other operations. The queue operations are the following:

StoR!msg0, StoR!msg1: write a message with bit 0 or 1 appended to StoR queue 211 (performed by sender 203);

StoR?msg0, StoR?msg1: read a message with bit 0 or 1 appended from StoR queue 211 (performed by receiver 205);

RtoS!ack0, RtoS!ack1: write an acknowledgement with bit 0 or 1 appended to RtoS queue 207 (performed by receiver 205); and RtoS?ack0, RtoS?ack1: read an acknowledgement with bit 0 or 1 appended from RtoS queue 207 (performed by sender 203);

The other operations are the following:

Snd: send a message from a higher level to sender 203 for transmission to receiver 205;

Rcv: send the message received from sender 203 to a higher level; and timeout: respond to expiration of a timeout (performed when receiver 205 has not responded to sender 203 within the timeout period).

A feature of both sender 203 and receiver 205 are loops, places in the finite state machines where a sequence of states can repeat itself. For example, at 217 in sender 203, the sequence of states 3,5,3,5,3... may repeat itself any number of times. Each time it repeats itself, another StoR!msg0 operation is performed, with the result that StoR queue 211 may contain a sequence of messages in which all of the messages have bit 0 appended. At loop 221, the sequence of states 8,10,8,10,8... may be repeated any number of times, with the result that queue 211 may contain a sequence in which all have bit 1 appended. The remaining loops 215 and 219 in sender 203 and loops 223 and 225 in receiver 205 deal with the consequences of such sequences with regard to the acknowledgement messages sent by receiver 205 and read by sender 203. An important consequence of the fact that loops 215 and 221 can be repeated any number of times is that StoR queue 211 and RtoS queue 207 both are unbounded, that is, they may contain any number of messages.

FIGS. 3 and 4 show the effect of the unbounded queues on the statespace for protocol 201. FIG. 3 shows a portion of the state space which shows the states that result when protocol 201 operates without a timeout in sender 203. Each global state 309 in the state space consists of control state 305, which specifies the state of both sender 203 and receiver 205, and queue content 307, which specifies the content of StoR 211 and RtoS 207 in that state. Each global state in FIG. 3 has its own reference number. Thus, in global state 304, the control state 305 indicates that sender 203 is in state 2, while receiver 205 is in state 1. Queue content 307 indicates that both queue 211 and queue 211 are empty.

Looking at FIG. 3 in more detail, initial global state 303 has both sender 203 and receiver 205 in state 1 and the queues are empty. In order for sender 203 to send a message, it must first receive a request to send from a higher level. Thus, the transition to the next global state 304 results from a Snd operation in sender 203. That operation places sender 203 in state 2, but does not affect receiver 205, which remains in state 1, so that global state 304 has control state 2,1. Since no messages have yet been sent, the queue content remains as it was. Having received a request to send, sender 203 writes a message with bit 0 appended to the tail of StoR queue 211, resulting in a transition to global state 306. Writing the message puts sender 203 into state 3, so the control state is now 3,1, while the queue content now includes the message in StoR 211.

Receiver 205 responds to the write to queue 211 by reading from the head of queue 211, causing a transition to global state 313. Since the queue only has one message, what is read is the message just written to it by sender 203. Reading the message places receiver 205 in state 3 but does not affect sender 203, so the new control state is 3.3. Receiver 205 has read the message, so both queues are again empty. Next, receiver 205 responds to the message by placing the acknowledge message in RtoS queue 207. That results in a transition to global state 317, with control state 3,4 and queue content in which RtoS 207 contains a single acknowledgement message with an appended 0 bit.

Sender 203 and receiver 205 continue cooperating as set forth above through global states 319 through 331. The transition from 331 returns to global state 303, thus completing the cycle of receiving a request to send in sender 203, transmitting a message with the 0 bit appended, receiving the message in receiver 205, sending an acknowledgement for that message with the 0 bit appended to sender 203, providing the received message to a higher level, receiving another request to send in sender 203, transmitting a message with the 1 bit appended, receiving the message in receiver 205, sending an acknowledgement for the message with the 1 bit appended to sender 203, and providing the received message to the higher level.

As shown in FIG. 3, as long as there are no timeouts, the state space for protocol 201 remains finite. FIG. 4 shows what happens with timeouts. FIG. 4 starts with global state 306 of FIG. 3, but this time, there is a timeout. Consequently, the transition is not to global state 313, but rather to global state 403, with control state 5.1 and a single message 0 in StoR queue 211. Sender 203 responds to the timeout by again writing to StoR queue 211, resulting in the transition to global state 405. This has the same control state as state 306, but a different queue content, namely two messages 0 in StoR queue 211. That in turn means that each of global states 405 through 413 differs from states 313 through 323 of FIG. 3 by its queue content. The differing queue content then causes receiver 205 to execute loop 225, resulting in the new sequence of control states in global states 413, 415, and 417, and differing queue contents in states 419 through 421. The differing queue contents result in the execution of loop 219 in sender 203, resulting in further differing control states and queue contents in global states 421 and 423.

As will be immediately obvious from FIG. 4, the combination of the existence of the timeout operation in sender 203 with the fact that StoR queue 211 and RtoS queue 207 may be of any length means that the state space of protocol 201 is infinite. Since that is the case, protocol 201 cannot be verified by making a state graph 119 for the protocol and analyzing the state graph to make sure that there are no states in the state graph which violate whatever constraints the protocol is subject to.

Figure 5:
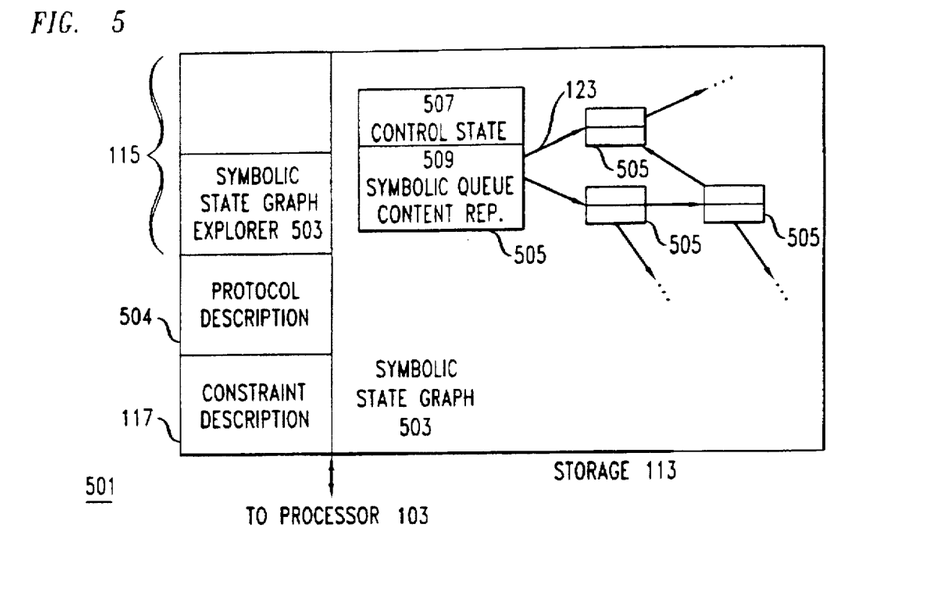
FIG. 5 is a high-level diagram of a verification system using the invention.
Figure 6:
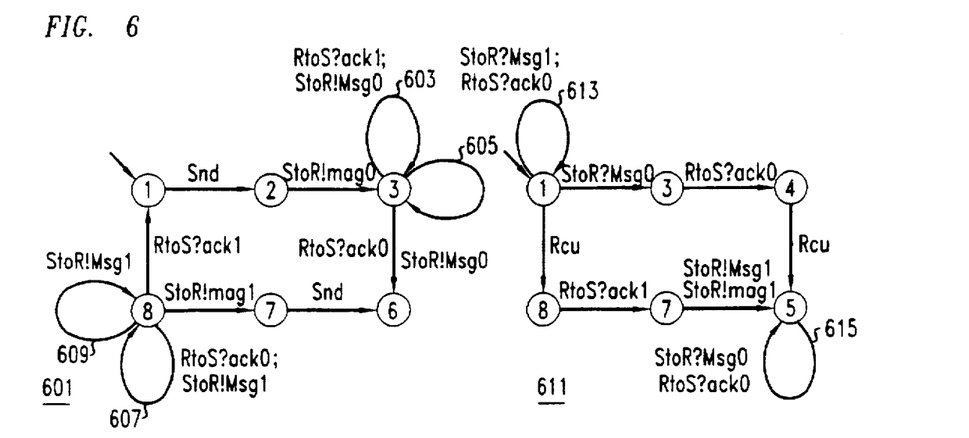
FIG. 6 is a diagram of protocol 201 which represents the protocol using meta transitions.
Figure 7:
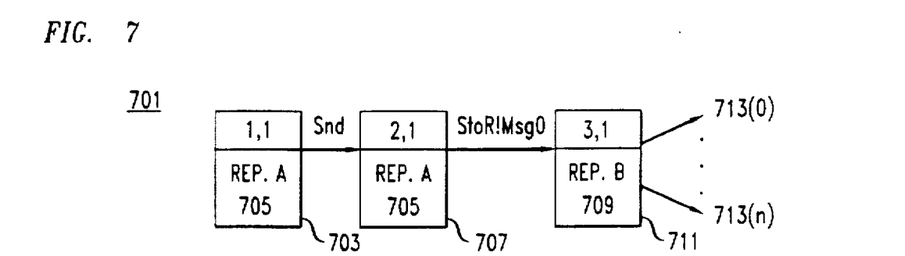
FIG. 7 is a diagram of a portion of a symbolic state graph 503 for protocol 201.

State Graphs with Symbolic Queue Content Representations: FIGS. 5–7

Two problems need to be solved in order to apply prior-art protocol verification techniques employing state space exploration to protocols whose state space is infinite. First, one needs a representation for infinite sets of states. Second, one needs a search technique that can explore an infinite number of states in a finite amount of time.

In the context of the verification of communication protocols as defined in the previous Section, our solution to the first problem is to represent the control part explicitly and the queue-contents "symbolically". Specifically, we will use special data structures for representing (possibly infinite) sets of queue-contents associated with reachable control states.

To solve the second problem, we will use these data structures to simultaneously explore (possibly infinite) sets of global states rather than individual global states. This will be done using meta-transitions, as explained in B. Boigelot and P. Wolper, "Symbolic Verification with Periodic Sets", in *Proc. 6th Conference on Computer Aided Verification*, vol. 818 of *Lecture Notes in Computer Science*, Stanford, Calif., Springer Verlag, June 1994, pp. 55–67. Given a loop that appears in the protocol description and a control state c in that loop, a meta-transition is a transition that generates all global states that can be reached after repeated executions of the body of the loop. By definition, all these global states have the same control state c. Consequently, what the meta-transition must do is generate special data structures representing the sets of queue contents for that control state.

Once data structures have been devised for representing sets of queue contents and meta transitions have been made for loops (indeed, not all loops need be matched by a meta-transition) in the protocol being verified, the classical enumerative state-space exploration algorithm can be rewritten in such a way that it works with sets of global states, as opposed to individual global states. A set of global states is represented by a pair of the form (control state, data structure). Initially, the search starts from an initial global state. At each step during the search, whenever meta-transitions are executable, they are explored first, which is a heuristic aimed at generating many reachable states as quickly as possible. This is why we call such a search a loop-first search. The search terminates if the representation of the sets of reachable global states stabilizes. This happens when, for every control state, every new deducible queue-content is included in the current set of queue-contents associated with that control state. At this moment, the current set of pairs (control state, data structure) represents exactly the state space of the protocol being analyzed.

What is needed to implement a system which will employ the verification method described above is first, to define a data structure for representing (possibly infinite) sets of queue-contents, and second, to define algorithms for manipulating these data structures. The purpose of the manipulations is the following: whenever a transition or a meta-transition is executed from a pair (control state, data structure) during a loop-first search, the new pair (control state, data structure) obtained after the execution of this (meta-)transition has to be determined. In order to do this, one needs to be able to compute a new data structure representing the effect of sending a message to a queue ($q_i$!m) and receiving a message from a queue ($q_i$?m), as well as the result of executing frequent types of meta-transitions, such as repeatedly sending a message on a queue (($q_i$!m)*), repeatedly receiving a message from a queue (($q_i$?m)*), and repeatedly receiving a message $m_1$ from a queue $q_i$ followed by sending another message $m_2$ on another queue $q_j$, i≠j, (($q_i$?$m_1$; $q_j$!$m_2$)*). Finally, basic operations on sets are also needed, such as checking if a set of queue-contents is included in another set, and computing the union of two sets of queue-contents.

FIG. 5 provides an overview of a protocol verification system 501 which works according to the principles set forth above. System 501 has a processor and I/O devices like those shown in FIG. 1. However, instead of protocol description 116 and state graph 119, system 501 has protocol description 504, in which loops are replaced with meta transitions, and symbolic state graph 503. Symbolic state graph 503 is made up of nodes 505 linked as before by transitions 123. A node 505 has two parts: control state 507, which contains control state for the node, and a data structure 509 which symbolically represents the entire set of queue contents associated with control state 507. Verification program 115 includes code for symbolic state graph explorer 503, which uses the algorithms described above to determine the symbolic queue content representation 509 resulting from a regular or meta transition.

FIGS. 6 and 7 put the foregoing into the context of alternating bit protocol 201. FIG. 6 shows protocol 201 with meta transitions replacing the loops. In sender 601, meta transition 603 replaces loop 215, meta transition 605 replaces loop 217, meta transition 607 replaces loop 219, and meta transition 609 replaces loop 221. In receiver 611, meta transition 613 replaces loop 223 and meta transition 615 replaces loop 225. FIG. 7 shows a portion 701 of the symbolic state graph for protocol 201. Each symbolic global state has one control state 305 as before, but queue contents 307 have been replaced by symbolic representations for all possible sets of queue contents for the control state.

The initial symbolic global state 703 has an initial control state of 1,1 and symbolic representation A 705 which represents the set of queue contents which is the empty queues RtoS 207 and StoR 211. The next symbolic global state 707 has control state 2,1 and still has representation A 705. The next symbolic global state 711 has control state 3,1, which represents the effect of sending the message msg0 to queue StoR 211. Transitions 713(0 . . . n) from state 711 involve meta transitions 603 and 605. The global states reached after these transitions still have control state 3,1, but are associated with new representations representing all possible sets of queue contents resulting from the execution of the corresponding meta-transition.

Figure 8:
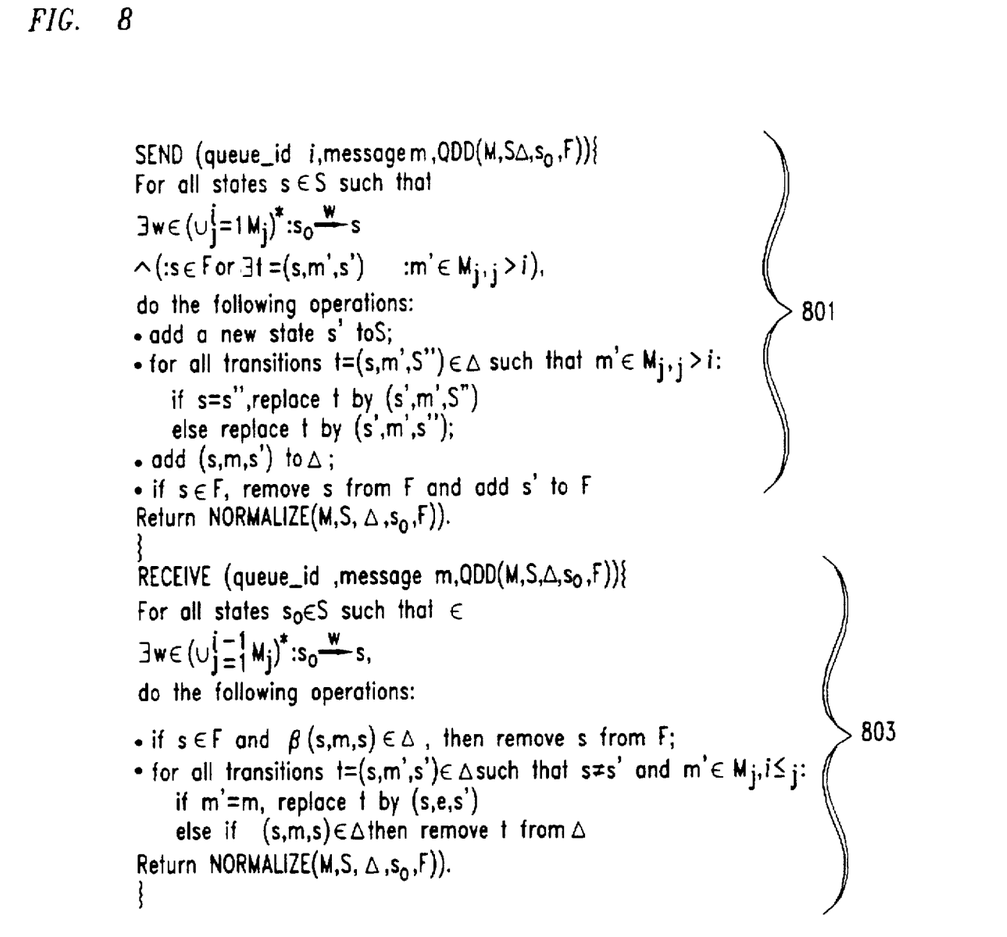
FIG. 8 is algorithms for the $q_i!m$ and $q_i?m$ operations.

Formal Definition of the Invention: FIGS. 8 and 9

In a preferred embodiment, the symbolic representations of the queue contents are Queue-content Decision Diagrams (QDDs). A QDD is a data structure that provides a finite representation of infinite sets of states.

Formal Definition of a QDD

A QDD is a special type of finite-state automaton on finite words. A finite-state automaton on finite words is a tuple A=($\Sigma$, S, $\Delta$, $s_0$, F), where $\Sigma$ is an alphabet (finite set of symbols), S is a finite set of states, $\Delta \subset S \times \Sigma \times S$ is a transition relation, $s_0 \in S$ is the initial state, and $F \subset S$ is a set of accepting states. A finite sequence (word) w=$a_1 a_2 \ldots a_n$ of symbols in $\Sigma$ is accepted by the automaton A if there exists a sequence of states $\sigma = s_0 \ldots s_n$ such that $\forall 1 \leq i \leq n: (s_{i-1}, a_i, s_i) \in \Delta$, and $s_n \in F$. The set of words accepted by A is called the language accepted by A, and is denoted by L(A). Let us define the projection $w|_{M_i}$ of a word w on a set $M_i$ of messages in a queue as the subsequence of w obtained by removing all symbols in w that are not in $M_i$.

More precisely, QDDs are defined as follows.

Definition 1 A QDD A for a protocol P is a deterministic finite-state automaton (M, S, $\Delta$, $s_0$, F) on finite words that satisfies the following property:

$$\forall w \in L(A): w = w|_{M_1} w|_{M_2} \ldots w|_{M_n} \qquad 1$$

A QDD is associated with each control state reached during a loop-first search, and represents a set of possible queue-contents for this control state. Each word w accepted by a QDD defines one queue-content $w|_{M_i}$ for each queue $q_i$ in the protocol.

By Property 1 of Definition 1, a total order < is implicitly defined on the set Q of all queues $q_i$ in the protocol such that, for all QDDs for this protocol, transitions labeled by messages in $M_i$ always appear before transitions labeled by messages in $M_j$ if i<j. Therefore, for all QDDs for a protocol, a given queue-content can only be represented by one unique word. In other words, Property 1 implicitly defines a "canonical" representation for each possible queue-content.

Operations on QDDs

Standard algorithms on deterministic finite-state automata on finite words can be used for checking if the language accepted by a QDD is included in the language accepted by another QDD, for computing the union of QDDs, etc. see for example H. R. Lewis and C. H. Papadimitriou, *Elements of the Theory of Computation*, Prentice-Hall, 1981. $\cup A_2$ will denote an automaton that accepts the language $L(A_1) \cup L(A_2)$, while NORMALIZE(A) will denote a QDD that accepts the same language as the automaton A. More precisely, NORMALIZE(A) determinizes the automaton A. For details on the NORMALIZE function, see for example H. R. Lewis and C. H. Papadimitriou, *Elements of the Theory of Computation*, Prentice Hall, 1981.

We now describe how to perform the other basic operations on QDDs described above.

Let A be the QDD associated with a given control state c. Let L(A) denote the language accepted by A, and let $L_{op}(A)$ denote the language that has to be associated with the control state c' reached after the execution of a transition (c,op,c') from the control state c, with $op \in \{q_i!m, q_i?m\}$. The simple StoR!msg0 operation of FIG. 6 is an example of a $\{q_i!m\}$ operation. Given the above definitions, we have the following:

$$L_{q_i!m}(A) = \{w' | \exists w \in L(A) : w'|_{M_i} = w|_{M_i} = w|_{M_i} m \wedge \forall j \neq i : w'|_{M_j} = w|_{M_j}\}$$

$$L_{q_i?m}(A) = \{w' | \exists w \in L(A) : w|_{M_i} = m w'|_{M_i} \wedge \forall j \neq i : w'|_{M_j} = w|_{M_j}\}$$

Algorithms for computing a QDD A' that accepts all possible queue-contents obtained after the execution of a transition of the form $q_i!m$ or $q_i?m$ on a QDD $A=(M, S, \Delta, s_0, F)$ are given in FIG. 8. SEND 801 computes a QDD upon a transition which writes a message to a queue and RECEIVE 803 computes a QDD upon a transition which reads a message from the queue. The correctness of these algorithms is established by the following two theorems.

Theorem 2 Let A be a QDD. Let A' denote the automaton returned by SEND(i, m, A), and let L(A') denote the language accepted by A'. Then A' is a QDD such that $L(A') = L_{q_i!m(A)}$.

Theorem 3 Let A be a QDD. Let A' denote the automaton returned by RECEIVE(i, m, A), and let L(A') denote the language accepted by A'. Then A' is a QDD such that $L(A') = L_{q_i?m(A)}$.

We now consider the meta-transitions discussed above. The operation $(q_i!m)^*$ denotes the union of all possible queue-contents obtained after sending k messages $m \in M_i$ on the queue $q_i$ of the system, for all $k \geq 0$. The operation $(q_i?m)^*$ denotes the union of all possible queue-contents obtained after receiving k messages $m \in M_i$ on the queue $q_i$ of the system, for all $k \geq 0$. The operation $(q_i?m_1; q_j!m_2)^*$ denotes the union of all possible queue-contents obtained after receiving k messages $m_1 \in M_i$ on the queue $q_i$ and sending k messages $m_2 \in M_j$ on the queue $q_j$, for all $k \geq 0$, and for $i \neq j$. Again referring to FIG. 6, meta-transitions 605, and 609 are examples of the $(q_i!m)^*$ operation, while meta-transitions 603, 607, 613, and 615 are examples of the $(q_i?m_1; q_j!m_2)^*$ operation.

Let A be the QDD associated with a given control state c. Let L(A) denote the language accepted by A, and let $L_{op}(A)$ denote the language that has to be associated with the control state c reached after the execution of a meta-transition (c, op, c) with $op \in \{(q_i!m)^*, (q_i?m)^*, (q_i?m_1; q_j!m_2)^*\}$. We have the following:

$$L_{(q_i!m)^*}(A) = \{w' | \exists w \in L(A), k \geq 0 : w'|_{M_i} = w|_{M_i} m^k \wedge \forall j \neq i : w'|_{M_j} = w|_{M_j}\},$$

$$L_{(q_i?m)^*}(A) = \{w' | \exists w \in L(A), k \geq 0 : w|_{M_i} = m^k w'|_{M_i} \wedge \forall j \neq i : w'|_{M_j} = w|_{M_j}\},$$

$$L_{(q_i?m_1;q_j!m_2)^*}(A) = \{w' | \exists w \in L(A), k \geq 0 : w|_{M_i} = m_1^k w'|_{M_i} \wedge w'|_{M_j} = w|_{M_j} m_2^k \wedge \forall l \neq \{i,j\} : w'|_{M_l} = w|_{M_l}\}.$$

Algorithms for computing a QDD A' that accepts all possible queue-contents obtained after the execution of a meta-transition of the form $(q_i!m)^*$, $(q_i?m)^*$, or $(q_i?m_1; q_j!m_2)^*$ on a QDD $A=(M, S, \Delta, s_0, F)$ are given in FIG. 9. There are three such algorithms. SEND-STAR 901 is for meta transitions of the form $(q_i!m)^*$, RECEIVE-STAR 903 is for meta transitions of the form $(q_i?m)^*$, and RECEIVE-SEND-STAR 905 is for meta transitions of the form $(q_i?m_1; q_j!m_2)^*$. The correctness of these algorithms is established by the following theorems.

Theorem 4 Let A be a QDD. Let A' denote the automaton returned by SEND-STAR(i, m, A), and let L(A') denote the language accepted by A'. Then A' is a QDD such that $L(A') = L_{(q_i!m)^*}(A)$.

Theorem 5 Let A be a QDD. Let A' denote the automaton returned by RECEIVE-STAR(i, m, A), and let L(A') denote the language accepted by A'. Then A' is a QDD such that $L(A') = L_{(q_i?m)^*}(A)$.

Theorem 6 Let A be a QDD. Let A' denote the automaton returned by RECEIVE-SEND-STAR(i, $m_1$, j, $m_2$, A), and let L(A') denote the language accepted by A'. Then A' is a QDD such that $L(A') = L_{(q_i?m_1;q_j!m_2)^*}(A)$.

It is worth noticing that, as an immediate corollary of the last theorem, the language $L(q_{i?m_1;q_j!m_2)^*}(A)$ is regular.

An Example Implementation

The following discussion will describe an example implementation of a verifier for the alternating-bit protocol which uses QDDs. The discussion will begin with a very high-level overview of the implementation and will then present more detail.

Figure 12:
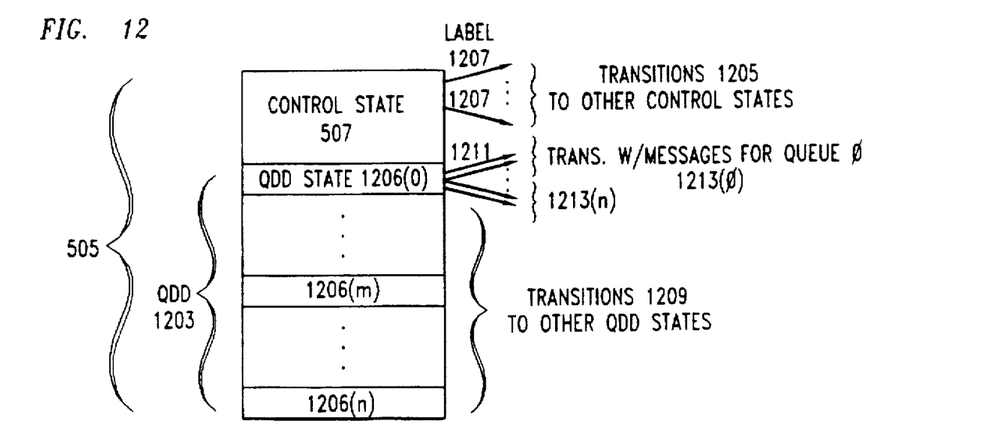
FIG. 12 is an overview of a system state and a QDD in a preferred embodiment.

Overview of the Operation: FIG. 12

A very high-level description of the operation of the implementation may be given with the help of FIG. 12. FIG. 12 shows a single node 505 of symbolic state graph 503 in an embodiment in which symbolic queue content representation 509 is implemented by means of a QDD 1203. As explained with regard to FIG. 5, each node 505 specifies a control state 507 from which transitions 1205 may be made to other control states 507 (including the one at which the transition originated). Each transition has a label 1207 which indicates an operation which is performed on the transition; these operations often involve adding a message to a queue or removing the message from a queue.

As described above, each new content of the queue represents a new state of the system; the states resulting from the queue contents are represented in the implementation by QDD 1203. QDD 1203 is itself a finite state automation, and consequently, consists of a set of states 1206(0 . . . n), each of which of course has transitions 1209 to states in the set of states 1206 with labels 1211 indicating messages to the queues. The transitions 1209 for a given state are segregated into subsets 1213 of transitions according to their labels, with transitions whose labels specifying messages to a given queue being grouped together. For example, all of the transitions of state 1206(0) whose messages are for the system's queue (0) are in subset 1213(0).

At beginning of the operation of the preferred embodiment, there is a finite state machine representing the system. The embodiment makes a QDD 1203 that accepts only the empty word (a single accepting state and no transition) and associates the QDD 1203 with the initial state of the state machine representing the system. Then the implementation recursively explores the state space of the system automaton and the QDD's. As each transition is taken, the operation represented by the transition's label is performed on the QDD for the state from which the transition is made. As a result of the performance of these operations, new states and transitions are added to the QDDs, but if the system is one for which the queue states can be represented by QDD's, eventually a point is reached in the exploration where the states resulting from the exploration are already contained in the QDD's. When this point is reached, the exploration terminates, and the finite state automaton for the system and the QDD's together provide a finite representation of the infinitely large state space of the system.

Figure 10:
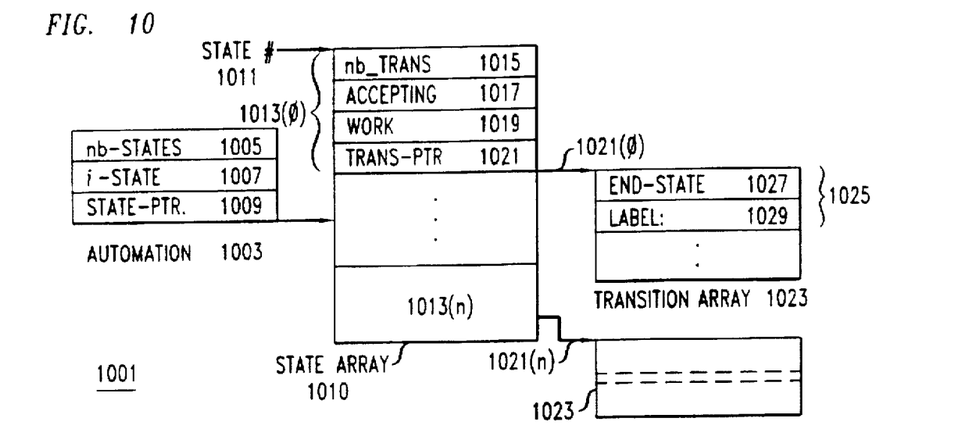
FIG. 10 is a diagram of the data structure used in the preferred embodiment to represent an automaton.
Figure 11:
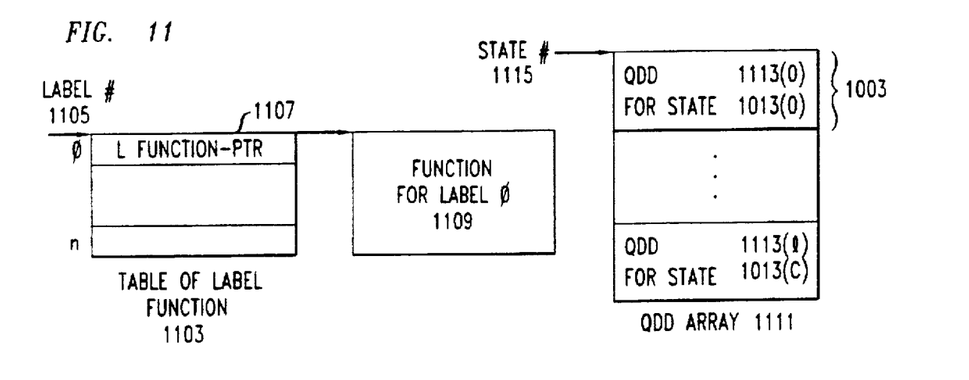
FIG. 11 is a diagram of other data structures employed in the preferred embodiment.

Details of a Preferred Embodiment: FIGS. 10 and 11

In the following, important data structures used in the preferred embodiment will be described, and then the operation of the preferred embodiment will be described in terms of those data structures.

Beginning with FIG. 10, that figure shows the data structure 1001 used to represent automata in the preferred embodiment. Data structure 1001 is used both for the finite state automaton representing the system and the QDD's 1203. Each automaton is represented by an automaton structure 1203. Each automaton has a state array 1010 which contains state structures 1013 for all states belonging to the automaton represented by automaton structure 1203. Each state in the array is identified by its state number, 1011, which is the index of the state structure 1013 in state array 1010. Each state has associated with it a transition array 1023 which contains the transitions from that state to other states.

Continuing in more detail, automaton structure 1003 has three fields. nb_states 1005 indicates the number of states in the automaton, i_state 1007 is the state number of the automaton's initial state, and state_ptr 1009 is a pointer to state array 1010. State structure 1013 has four fields: nb_trans 1015 indicates the number of transitions from the state; accepting 1017 indicates whether the state is an accepting state; mark 1019 indicates whether the state has previously been visited; and trans_ptr 1021 points to transition array 1023 for the state. Each transition is represented by a transition array element 1025 which contains two fields: end_state 1027 is the state number 1011 of the state which results from the transition represented by element 1025 and label 1029 is an integer which represents the operation with which the transition is labelled.

Continuing with the implementation of the operations in the preferred embodiment, as shown in FIG. 11, there is an operation function 1109 for each label 1029. The relationship between the label and the function is established by table of label functions 1103. Each entry 1107 in table 1103 represents one value which may occur in label 1029. The value is label number 1105, which is the index of entry 1107 in the table, and entry 1107 contains a pointer to function 1109 for the operation represented by the label. In the preferred embodiment, the functions correspond to the $q_i!m$, $q_i?m$, $(q_i!m)^*$, $(q_i?m)^*$, and $(q_i?m_1; q_j!m_2)^*$ functions previously described.

Finally, QDD array 1111 associates states of the system automaton with the QDDs 1203 for the states. QDD array 1111 is an array of automaton structures 1003 for QDD's 1203, one for each state of the system automaton. The index 1115 of the automaton structure for a QDD 1203 in the array is the number of the state in the system automaton with which the QDD is associated.

The presently-preferred embodiment is a prototype in which the system automaton being tested is a system which employs the alternating-bit protocol. The system has two queues, StoR queue 211 and RtoS queue 207; StoR queue 211 contains two kinds of messages, one kind with bit 0 appended and the other with bit 1 appended; RtoS queue 207 contains two kinds of acknowledgements, one with bit 0 appended and the other with bit 1 appended; each message and acknowledgement may be written to its queue or read from its queue; there are thus the eight queue operations described earlier, four for StoR queue 211 and four for RtoS queue 207. The eight messages are the alphabet which make up the words which the QDDs of the prototype accept.

In the preferred embodiment, a QDD 1203 is implemented using automaton data structure 1001. Each QDD state 1206 is represented by a state array element 1013 and each transition out of a given state is represented by a transition array element 1025. The eight operations are mapped onto values 0-7 of label 1029 as follows: 0-3 are operations on queue 211; 4-7 are operations on queue 213. The transitions in transition array 1023 for a state are sorted by increasing value of label 1029; consequently, transitions for operations on StoR queue 211 always precede transitions for operations on RtoS queue 207, and structure 1001 for QDD 1203 thus satisfies the requirement that in a given state of a QDD, all transitions for operations on a given queue of the system are grouped together.

The preferred embodiment first creates a QDD 1203 which represents the initial state of the system's queues: both StoR queue 211 and RtoS queue 207 are empty and the QDD accepts the null word. The QDD 1203 has a single state, which is set to accepting, and no transitions. Next, the prototype makes an automaton which represents the sender in the alternating-bit protocol and another automaton which represents the receiver. This is done in the preferred embodiment as follows: for each automaton, the requisite number of states is specified, resulting in the creation of an automaton structure 1003 with a state array 1010 of the proper size. Then, for each state, the state's transitions are specified, resulting in the creation of a transition array 1203 for each of the states. When this is done, a single system automaton is made by computing the product of the send automaton and the receive automaton. The system automaton contains all of the states of each automaton. Within the system automaton, the transitions for the states are sorted by increasing label value. Next, the prototype makes QDD array 1111. The QDDs in the array are empty, that is, they have a single unmarked non-accepting state with no transitions.

At this point, the state exploration begins. Exploration is done by the recursive function explore_step, which takes as its arguments the system automaton, label function table 1103, a state of the system automaton, and a QDD 1203. On the initial invocation, the state is the initial state of the system automaton and the QDD 1203 is the QDD 1203 representing the initial state of the system's queues.

explore_step first tests for the termination conditions and then unions the QDD 1203 received as an argument with the QDD 1203 associated with the state received as an argument. Then the function gets each transition for the state received as an argument, and for each transition, it produces a new QDD 1203 by performing the operation specified by the transition's label on the QDD 1203 associated with the argument. The new QDD 1203 is then used together with the system automaton, label function table 1103, and the system automaton state indicated in the transition as an argument in a recursive invocation of explore_step. The recursions continue until either the QDD 1203 received as an argument is empty or its states are included in the one associated with the state received as an argument in QDD array 1111.

As an example of how the label functions operate, three transitions made by the system automaton will be explored in detail. The first of these transitions goes from state 1.1 to state 2.1, with no operation on the queues. The second goes from state 2.1 to state 3.1 and performs the operation of sending a message with bit 0 appended to queue 0. The third transition is a meta-transition which goes from state 3.1 to state 3.1 and performs the operation of sending a sequence of messages with bit 0 appended to queue 0. For the first transition, the label function simply returns a copy of the QDD 1203 for the current state of the system automaton, i.e., a copy of QDD 1203 for state 0. For the second transition, the label function invokes a function called qdd_send_one_msg. This function implements SEND function 801 shown in FIG. 8, which in turn describes the $q_i!m$ function.

qdd_send_one_msg takes as its arguments a copy of the QDD 1203 associated with the state sending the message (here, state 2.1), the number of the queue which is to receive the message (here, queue 0), and 0, which represents a message with bit 0 appended which has been sent to StoR queue 211. The function first makes a list of all of the states 1206 of the QDD 1203 received as an argument which are reachable from that QDD's initial state by a transition whose label 1029 represents a word in the QDD's language. Then the function takes states from the list one-by-one. For each state, the function first checks whether the current state is an accepting state. If it is, it makes a new state for the QDD, moves the current state's transitions to the new state, and adds a transition from the current state to the new state, with the label corresponding to the message (here 0) for that transition. The current state is then made into a non-accepting state and the new state is made an accepting state.

If the current state on the list is not an accepting state, the function examines each of the state's transitions until it finds one whose label 1029 is not a word which defines a queue content for the queue provided as an argument for the function. It then proceeds as defined above for the accepting state, except that both the current state and the new state remain non-accepting states.

Once all of the states on the list have been processed as described above, qdd_send_one_message cleans QDD 1203, i.e. for each state, it sorts the transitions by the value of label 1029, reduces multiple occurrences of the same transition to a single example thereof, and removes transitions to a null end state. Next, the function determinizes the QDD 1203, i.e., makes the QDD 1203 into a deterministic finite state automaton by rearranging it so that there is only one transition for a given message from a given state. The determinization corresponds to the normalization operation previously described. Finally, the function frees the list of states and returns. In summary, at the end of the operation, the resulting QDD has a first non-accepting state, a second accepting state, and a transition from the first to the second state with the label 1209 0. That QDD 1203 is now the QDD associated with state 3.1.

The next state is 3.1. The transitions from this state include three meta-transitions (603,605, and 613) in which the system returns to state 3.1 and simple transitions from 3.1 to 6.1 and from 3.1 to 3.3. In the following, the implementation of meta-transition 605 will be explained in more detail. This meta-transition occurs when sender 601 sends a message to receiver 611 and receives no response. After a time out, sender 601 again sends its message. The meta-transition may thus be repeated any number of times. As explained above, when explore_step encounters meta-transition 605, it performs the operation specified in label function table 1103 for that meta-transition and produces the new QDD 1203 required for the transition.

In the case of meta-transition 605, the label function invokes the function qdd_send_msgs, which corresponds to the function $(q_i!m)^*$ or SEND-STAR 901 of FIG. 9. The arguments are a copy of the QDD 1203 associated with state 3.1 and values indicating that a message with the value 0 has been sent to queue 211. qdd_send_msgs begins by obtaining a list of all of the states of the system automaton which are reachable from the current state by a word in the language of the QDD for the state. For each state on the list, the function first determines whether the state is an accepting state.

If the state is accepting, the function creates two new non-accepting states, s2 and s4 in the QDD 1203 and then gets each transition from the state: if the transition's label points beyond the part of QDD 1203 for the specified queue, the transition is invalidated and a new transition is added. If the transition is not back to the current state, a new transition from s2 to s3 is added to new state s2, otherwise, the transition is from s2 to itself. In either case, the label 1029 is that of the transition being processed. Thereupon, the function adds a transition with the NULL label from the current state to new state s4, a transition with the NULL label from new state s4 to new state s2, and a transition from s4 to itself. The transition is labelled with the value, here 0, of the message being sent. If the current state is an accepting state, the current state is set to be non-accepting and new state s2 is set to be accepting. The function then cleans and determinizes the QDD for the state as described above.

If qdd_send_msgs is invoked for the initial QDD, queue 0, and a message whose label value is 0, then what happens is the following. The initial QDD 1203 has a single accepting state with no transitions. Since that state is accepting, qdd_send_msgs adds the two new states s2 and s4 to initial QDD 1203 and adds transitions with the NULL label from the original state to state s4, from state s4 to s2, and a transition with the label provided as an argument from state s4 to itself. The original state is set to be non-accepting and state s2 is set to be accepting.

As will be readily apparent to those skilled in programming, the other operations of FIGS. 8 and 9 may be implemented using the data structures of the preferred embodiment in a manner similar to the implementations of the SEND and SEND-STAR operations just described.

Performance of the Prototype

The prototype implementation just described was written in the C programming language. When executed on a SPARC10 workstation manufactured by Sun Microsystems, Inc. (SPARC10 is a trademark of Sun Microsystems), the prototype implementation for the Alternating-Bit protocol terminates after 5.9 seconds. The number of transitions and meta-transitions executed is 331. The largest QDD constructed during the search contains 21 states, and 52 control states are reachable from the initial state.

The representation of the protocol produced by the prototype implementation can be used to check many properties. For instance, it is straightforward to use the representation to prove that the protocol does not contain any deadlocks, that there are reachable control states where the number of messages in a queue is unbounded, that the messages are always delivered in the correct order, etc.

The techniques just described have also been tested on several variants of the Alternating-Bit protocol, where the transitions labeled by "timeout" are removed from the protocol description, where the Sender/Receiver have various number of control states, etc. An interesting variant is the case where queues may lose messages (to model unreliable transmission media). In order to handle this case, it is sufficient to define one additional algorithm SENDLOSSY (i,m, A), that merely returns A∪ SEND(i, m, A). We also performed experiments on several sliding-window protocols, with various window sizes. For all these examples with infinite state spaces (more than 20 in total), our tool was able to successfully terminate its search within a few minutes of computation. This shows that at least for this particular though important class of examples, our verification method is very useful and robust.

Of course, it is possible to design examples of protocols for which our tool would not terminate its search. This is the case for examples for which the language of queue-contents associated with at least one control state is not regular. Even if, for all reachable control states c, there exists a QDD that can represent the language of queue-contents associated with c, a loop-first search may not be able to capture the "regularity" of the infinite state space. We believe that such protocols are not frequently encountered in practice.

Conclusion

The foregoing Detailed Description has disclosed novel techniques for performing formal verification using symbolic representations of unbounded queues and showed those skilled in the art of formal verification how to make and use such symbolic verifications. Though the Detailed Description has disclosed the best mode presently known to the inventors of practicing their techniques, it will be immediately apparent to those skilled in the relevant arts that the principles disclosed herein may be applied in ways other than those disclosed herein. In particular, the symbolic representations may be used not only with finite-state-machine representations of the systems being verified, but also with other representations of those systems. For example, the automata used to represent the processes of the system being analyzed and the control part of the state space may all be represented with binary decision diagrams (BDDs). Further, unbounded queues may be represented by symbolic representations other than the particular QDDs disclosed herein. Moreover, implementations of the techniques may use data structures different from those disclosed herein to represent the finite state machines and QDD's and may use different algorithms for doing state exploration.

All of the above being the case, the Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A verification tool implemented in a computer system for verifying that a protocol satisfies at least one constraint of a plurality of constraints, the verification tool comprising:

a memory for storing a description of the protocol, the protocol having a plurality of control states, the protocol being defined as a function of a finite state machine and at least one queue having an unbounded capacity for storing a plurality of messages;

a set of symbolic representations for the at least one queue, each one of the symbolic representations being a function of a finite state automaton and corresponding to a particular one of the plurality of control states of the protocol, the finite state automaton having at least one sequence of transitions which correspond to particular ones of the plurality of messages stored in the at least one queue;

a processor for constructing a state graph of the protocol, the state graph constructed using the description of the protocol and the set of symbolic representations such that at least one of the plurality of control states of the protocol is depicted in the state graph; and a verification program executed by the processor which analyzes the state graph for verifying that the protocol satisfies the at least one constraint of the plurality of constraints.

2. The verification tool of claim 1 wherein the sequence of transitions of the finite state automaton has an order which is determined by an order of the plurality of messages stored in the at least one queue.

3. The verification tool of claim 1 wherein the finite state automaton is represented as a tuple having the form (Σ, S, Δ, $s_0$, F), where Σ is a finite set of symbols, S is a finite set of states, Δ is a transition relation, $s_0$ is an initial state, and F is a set of accepting states.

4. A method for verifying a protocol used in a communication system, the communication system having a sender and a receiver which exchange a plurality of messages using the protocol, the method comprising the steps of:

receiving a description of the protocol, the protocol having a plurality of control states, the protocol being defined as a function of a finite state machine and at least one queue having an unbounded capacity for storing particular ones of the plurality of messages exchanged by the sender and the receiver;

generating a set of symbolic representations for the at least one queue, each one of the symbolic representations being a function of a finite state automaton and corresponding to a particular one of the control states of the protocol, the finite state automaton having at least one sequence of transitions which correspond to the particular ones of the plurality of messages stored in the at least one queue;

constructing a state graph of the protocol, the state graph constructed using the description of the protocol and the set of symbolic representations such that at least one of the plurality of control states of the protocol is depicted in the state graph; and analyzing the state graph to verify that the protocol satisfies at least one of a plurality of constraints of the communication system.

5. The method of claim 4 wherein the sequence of transitions of the finite state automaton has an order which is determined by an order of the plurality of messages stored in the at least one queue.

6. The method of claim 5 wherein the description of the protocol includes a meta-transition which represents a loop in the protocol.

7. The method of claim 5 wherein the protocol is an alternating-bit protocol.

8. A method for verifying a protocol, the method comprising the steps of:

receiving a description of the protocol, the protocol having a plurality of control states, the protocol being defined as a function of a finite state machine and a plurality of queues, each one of the plurality of queues having an unbounded capacity and storing a plurality of messages;

generating a plurality of symbolic representations for at least one queue of the plurality of queues, each one of the symbolic representations being a function of a finite state automaton and corresponding to a particular one of the control states of the protocol, the finite state automaton having a plurality of sequences of transitions wherein a first sequence of transitions of the plurality of sequences represents the plurality of messages of a first one of the plurality of queues, and a second sequence of transitions of the plurality of sequences represents the plurality of messages of a second one of the plurality of queues;

constructing a state graph of the protocol, the state graph constructed using the description of the protocol and the plurality of symbolic representations such that at least one of the plurality of control states of the protocol is depicted in the state graph; and analyzing the state graph to verify that the protocol satisfies at least one of a plurality of constraints.

9. The method of claim 4 or 8 wherein the finite state automaton is represented as a tuple having the form ($\Sigma$, S, $\Delta$, $s_0$, F), where $\Sigma$ is a finite set of symbols, S is a finite set of states, $\Delta$ is a transition relation, so is an initial state, and F is a set of accepting states.

10. The method of claim 4 or 8 wherein the at least one queue is a first-in-first-out (FIFO) queue.

11. The method claim 8 wherein the description of the protocol includes a meta-transition which represents a loop in the protocol.

* * * * *